United States Patent
Waldner et al.

[11] Patent Number: 6,095,317
[45] Date of Patent: Aug. 1, 2000

[54] APPARATUS FOR TRANSPORTING WORKPIECE HOLDERS IN CIRCULATION

[76] Inventors: Paul R. Waldner, Pestalozzistrasse 12, D-61350 Bad Homburg; Bernd Gennat, Am Nussbaum 9, D-65835 Liederbach, both of Germany; Matt Recchia, 7 Calico Tree La., Coram, N.Y. 11727-2602

[21] Appl. No.: 09/188,394

[22] Filed: Nov. 10, 1998

[30] Foreign Application Priority Data

Nov. 10, 1997 [DE] Germany .......................... 197 49 450

[51] Int. Cl.[7] .......................... B65B 37/00; B65G 47/34; B65G 47/84
[52] U.S. Cl. .................................. 198/463.2; 198/463.3; 198/468.6; 198/775
[58] Field of Search .................. 198/346.1, 346.2, 198/468.6, 775, 774.1, 463.2, 463.3

[56] References Cited

U.S. PATENT DOCUMENTS

| | | | |
|---|---|---|---|
| 4,534,695 | 8/1985 | Stump et al. .................. | 198/775 X |
| 4,558,984 | 12/1985 | Garrett ........................... | 198/775 X |
| 4,727,976 | 3/1988 | Tsuchiya ........................ | 198/403 |
| 4,953,687 | 9/1990 | Gazzarrini ..................... | 198/775 X |
| 5,062,525 | 11/1991 | Terracol et al. ................. | 198/468.6 |
| 5,772,773 | 6/1998 | Wytman ......................... | 198/468.8 X |
| 5,781,988 | 7/1998 | Faraoni et al. ................. | 198/346.1 X |

FOREIGN PATENT DOCUMENTS

| | | |
|---|---|---|
| 37 05 561 C1 | 2/1988 | Germany . |
| 195 00 148 C1 | 8/1996 | Germany . |

*Primary Examiner*—Christopher P. Ellis
*Assistant Examiner*—Gene O. Crawford
*Attorney, Agent, or Firm*—Larson & Taylor

[57] ABSTRACT

The apparatus for transporting workpiece holders in circulation between a charging station (16), a work station (22) and a discharge station (26) has a carriage (20) with two sockets (36, 38) for workpiece holders (12) to be placed on it from above. The carriage can be moved between a front position and a rear position. In the first of these, one work piece holder (12) each with a workpiece can be set on the first and the second sockets. In the other position, the two workpiece holders (12) can be lifted from the carriage (20), and the workpiece holder (12) located in the work station (22) is clamped against the underside of a frame (24). From the discharge station (26), a conveyor system (14) transports the workpiece holders (12) back to the charging station (16).

17 Claims, 5 Drawing Sheets

Fig. 5

APPARATUS FOR TRANSPORTING WORKPIECE HOLDERS IN CIRCULATION

The invention relates to an apparatus for transporting workpiece holders in circulation between a charging station, a work station, and a discharge station, disposed in a straight horizontal row behind these two stations.

For many machining, processing and measurement operations, workpiece holders carried along through multiple stations are needed to assure precise fastening of workpieces, such as boards for electronic circuits. Since the workpiece holders repeatedly have to receive new workpieces as the production process continues, they have to be transported in circulation. This presents the problem of finding a transport apparatus that allows a short cycle, takes up little space, and can be manufactured economically.

Revolving conveyors cannot adequately meet these demands. Turntables take up a relatively large space. Moreover, like conveyor belts on which all the workpiece holders carried in circulation are secured, turntables have the disadvantage that every time they are indexed forward, a comparatively large mass has to be accelerated and decelerated. This disadvantage of the known revolving conveyor systems becomes troublesome above all when the measurement or machining time, for instance for an exposure operation or for using lasers, is very brief.

To overcome these disadvantages, according to the invention an apparatus is proposed which is characterized in that a carriage with a first and second socket, the latter offset in the direction of motion from the first, for workpiece holders to be set down on it vertically from above is movable back and forth between a front and a rear position, that in the front position of the carriage at the charging station a workpiece holder is placeable onto the first socket by a loading device and at the work station a workpiece holder is placeable on the second socket by a lifting device, whereas in the rear position of the carriage a workpiece holder is liftable from the first socket by the lifting device and at the discharge station a workpiece holder is liftable from the second socket by an unloading device, and that a conveyor system is present, by which the workpice holders can be transported back from the discharge station to the charging station.

By means of the novel apparatus with the special feature of a reciprocating double transport element as an essential part of a circulatory system, it is achieved that the cycle time outside the machining time depends only on the times needed for the motion of a small, lightweight carriage with sockets for only two workpiece holders. Every time one workpiece is being processed, the carriage makes a fast reverse trip in the unloaded state, and is then again ready to carry a processed workpiece from the work station and at the same time bring an unfinished workpiece to the work station again. Even if only three workpiece holders are used, about twice the machining time is available for returning them from the discharge station to the charging station.

Disposing the work stations in a row one after the other is favorable from a standpoint of production technology, and the space required is little since the motions take place in three planes one above the other. In the work station, the workpiece holders are held clamped in an uppermost plane, so that the carriage can move back and forth below them. Returning the workpiece holders is done by the conveyor system in a plane below the carriage. Thus the motions of the conveyor system and the carriage are also independent from one another, except for the transfer of the workpiece holders, which is preferably done by loading devices and unloading devices.

In a preferred practical embodiment of the invention, the workpiece holders are platelike parts with pins on their top sides, of which at least one is mounted adjustably in position on the workpiece holder so as to receive printed circuit boards of different sizes.

In a preferred embodiment of the invention, the carriage in plan view has the shape substantially of an H and is movable in the longitudinal direction of its legs. This shape offers the dual advantage that the carriage needs to have only a relatively small mass, and that in its front position the loading device and in its rear position the unloading device can enter into the space between the legs and can set down the workpiece holders on the carriage or lift them up from it.

So that the workpiece holders will each be held by one socket in a predetermined position on the carriage and also secured in this position during the acceleration phases, the sockets are each formed by at least two pins protruding upward from the top side of carriage, and the pins cooperate with correspondingly disposed bores in the workpiece holders. Since the terminal positions of a reciprocatable carriage are also easily determined by end stops, the workpiece holders and thus the workpieces fixed on them arrive in the clamping device at the work station in a very precisely defined position.

In a simple version, the carriage drive can comprise a pneumatic cylinder. Alternatively, other drives, such as an electric motor with a threaded spindle, are also possible.

The loading device and the unloading device preferable are lifting cylinders, disposed upright, with support plates on their upper end, the surfaces of the support plates being movable between a plane located above the carriage and a plate located below it and being provided with upward protruding pins, which cooperate with correspondingly disposed bores in the workpiece holders. Just as these simple lifting cylinders can be effective between the legs of the H-shaped carriage, they also are no hindrance to the function of the conveyor system, if the latter in a preferred version comprises parallel conveyor belts extending below the carriage but above the lower plane of the surface of the support plates, between which belts the loading device and the unloading device are disposed.

If workpieces of different thickness and which possibly also tend to warp, such as printed circuit boards, are resting on a tabletop or workpiece holder plate in a work station and an optical measuring instrument or machining device is to be employed, care must constantly be taken to maintain an exact focus. According to the invention, changes and adjustments in focusing can be dispensed with if in the work station a frame is mounted above the transport plane of the printed circuit boards or other workpieces and if the workpiece resting on the workpiece holder can be pressed from below against the frame by a lifting device. In this way a platelike workpiece can be fastened between the frame and the workpiece holder, and the top side of the workpiece, regardless of its thickness and any warping that may have been present before it was fastened but is eliminated by its fastening, extends in the plane of the underside of the frame. The optical instruments and devices are focused on this plane, which remains constant, and need not be constantly readjusted.

In the preferred embodiment of the invention, such a frame is mounted in the work station above the carriage. One workpiece holder at a time can be lifted from the carriage by the lifting device and pressed against the underside of the frame, and the printed circuit board carried by the workpiece holder is fastened between the workpiece holder and the frame. However, it will readily be understood that in a work station in which precise spacing between the surface of the workpieces and a measuring instrument or tool is critical, the basic principle described above, of bracing the workpieces against a bearing face not by their underside in the usual way but instead bracing them by their top side against the underside of a frame, can also be employed in workpiece transporting systems other than that described and claimed here. For instance, in a work station, above a turntable or delivery belts, a workpiece whose top side is to be machined and which is intrinsically dimensionally stable can be pressed only against the underside of a frame. If more unstable workpieces or such that have a greater tendency to warp are transported with conventional conveyor systems of the kind last mentioned above, and the clamping devices that pull them against the underside of the frame effect only an inadequate alignment, intrinsically rigid workpiece holders can be employed, which are transported with the turntable or other conventional conveyor system and are used in the work station for bracing the workpieces against the frame.

In a preferred further feature of the invention, so as not to have to change the entire frame every time a different size of printed circuit boards to be machined on a mass production basis has to be handled, the frame comprises a base frame and an adapter frame that can be braced detachably against the underside of the base frame and that corresponds in size to the printed circuit boards to be processed. In that case, when production changes over to a different size of printed circuit board, only the adapter frame has to be changed. The transport apparatus for the workpiece holders is expediently used for this purpose. In the setting-up operation, the carriage instead of transporting a workpiece holder transports the adapter frame to the work station, and the lifting device then presses the adapter frame against the underside of the base frame, where it is held by clamping means that are present in addition to the clamping means that later keep the workpiece holders, with the printed circuit boards resting on them, braced tightly against the underside of the adapter frame during the machining operation.

Because it would normally present difficulties to press the workpiece holders against the frame from below, tension claws mounted on opposite sides of the frame act as a lifting device in the work station; they pull the workpiece holders upward against the underside of the frame.

The frame against which the workpiece holders with the workpiece are firmly braced in the work station, may be mounted in stationary fashion. In that case, the measuring instrument or machining tool disposed above the frame in order to be positioned relative to the workpiece, must be movably guided under control in two axes. The invention also allows an embodiment in which the measuring instrument or machining tool is held in stationary fashion, and the frame carrying the workpiece can be positioned under control in two axes.

As already noted, the novel apparatus normally makes do with three workpiece holders transported in circulation, since for the return transport of the workpiece holders from the discharge station to the charging station, for instance by means of conveyor belts, about twice as much time as the machining time is available. However, if the machining time is very brief, then advantageously four workpiece holders in circulation can be employed, each of which is transported back to the loading device in two steps by the conveyor system.

If the workpieces are to be delivered automatically in a continuous processing line which includes additional work steps, then it is recommended that a charging device for placing printed circuit boards on the workpiece holders is disposed next to the charging station, and a discharge device for lifting printed circuit boards from the workpiece holders is disposed next to the discharge station. With the novel apparatus, however, it is also possible to work in such a way that both a charging device for placing printed circuit boards on the workpiece holders, and a discharge device for lifting printed circuit boards from the workpiece holders transported back by the conveyor system are disposed next to the charging station.

An exemplary embodiment of the invention is described in further detail below in conjunction with the drawing. Shown are.

Figure 1:
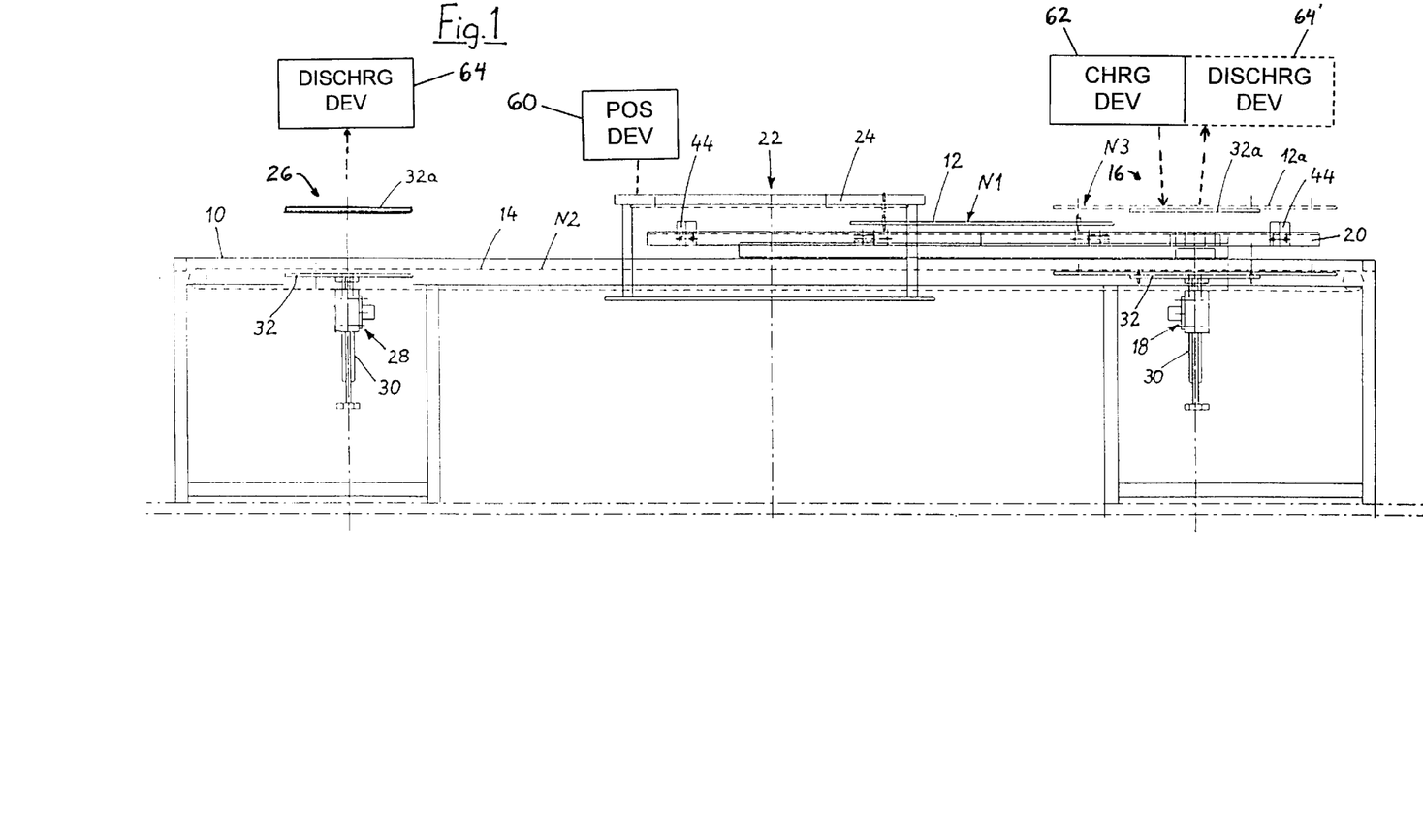
FIG. 1, a side view of an apparatus for transporting workpiece holders in circulation between a charging station, a work station, and a discharge station.

The exemplary embodiment, shown in simplified form in the drawing, of an apparatus according to the invention comprises a table-like stand 10, which can be set up on the floor and along which platelike workpiece holders 12 are transported from right to left, in terms of FIG. 1, at a level N1 and then back again from left to right at a lower level N2 that is defined by the upper run of conveyor belts 14.

The workpiece holders 12 conveyed in circulation are placed onto the right half of a carriage 20 on the right hand end of the stand 10 in a charging station 16 by means of a loading device 18. In each case, they have previously been equipped with a workpiece, such as a board for an electronic circuit. By moving the carriage 20 toward the left in terms of FIG. 1, the workpiece holders 12 along with the printed circuit boards to be processed pass into a work station 22 disposed in the middle of the stand 10. There, the workpiece holders and workpieces are lifted from the carriage 20 and pressed against the underside of a frame 24. The carriage 20 can then move back again to the right into the outset position and pickup a further workpiece holder, with a workpiece to be processed, in the charging station 16. In the meantime, the workpiece that has just before this been raised and pressed against the frame 24 has been processed in the work station 22. Before the carriage is put into motion again and moves toward the left, the workpiece holder that carries the processed workpiece is detached from the frame 24 and placed on the left half of the carriage 20. In the ensuing operation of transporting the carriage 20, thus on the one hand a workpiece holder 12 is again taken from the charging station 16 to the work station 22 and on the other at the same time the work-piece holder 12 previously braced in the latter is transported, with the finished, processed workpiece, from the work station 22 to a discharge station 26 located on the left-hand end of the frame 10.

After the carriage 20 has been stopped in its left-hand or rear terminal position, both of the transported workpiece holders, with all the workpieces seated on them, are lifted substantially simultaneously from the carriage 20, and directly after that the empty carriage 20 can move back into its right-hand or front terminal position again, in which the above-described loading operation, on the one hand at the loading station and on the other at the work station 22, is repeated. Meanwhile, in the discharge station 26, an unloading device 28 places the workpiece holder 12, lifted there from the carriage onto the upper run of the conveyor belts 14. These belts transport the workpiece holder from left to right back to the charging station 16, where it is lifted from the conveyor belts 14 by the loading device 18 and placed on the carriage 20 for the next trip in circulation.

The loading device 18 and the unloading device 28 are embodied identically in this exemplary embodiment. They each comprise vertically disposed lifting cylinders 30, which are provided on their upper end with a horizontally oriented support plate 32. Alternatively, instead of the lifting cylinders 30, electric motor drives with movable spindles may be used. In the upper terminal position of the support plate 32, marked 32a in FIG. 1, they are located at a level above the carriage 20, so that by raising the lifting cylinder 30 of the unloading device 28 by means of the support plate 32, workpiece holders can be lifted from the carriage 20 and, when the support plate 32 of the loading device 18 is lowered, the workpiece holders can be set down onto the carriage 20. In the lower terminal position of the lifting cylinder 30, the support plate 32 is located somewhat below the level N2, so that when the lifting cylinder 30 of the unloading device 28 is lowered, a workpiece holder 12 seated on the support plate 32 is set down onto the conveyor belts 14.

From the above description of the exemplary embodiment, it can be seen that the workpiece holders 12 are placed on three different levels during one revolution. At the topmost level N3, suggested by dashed lines at 12a, at which level they are temporarily located in the charging station 16 and in the discharge station 26, and which can also coincide with their level during processing in the work station 22, they are raised far enough away from the carriage 20 that the carriage can move unhindered below them.

Figure 2:
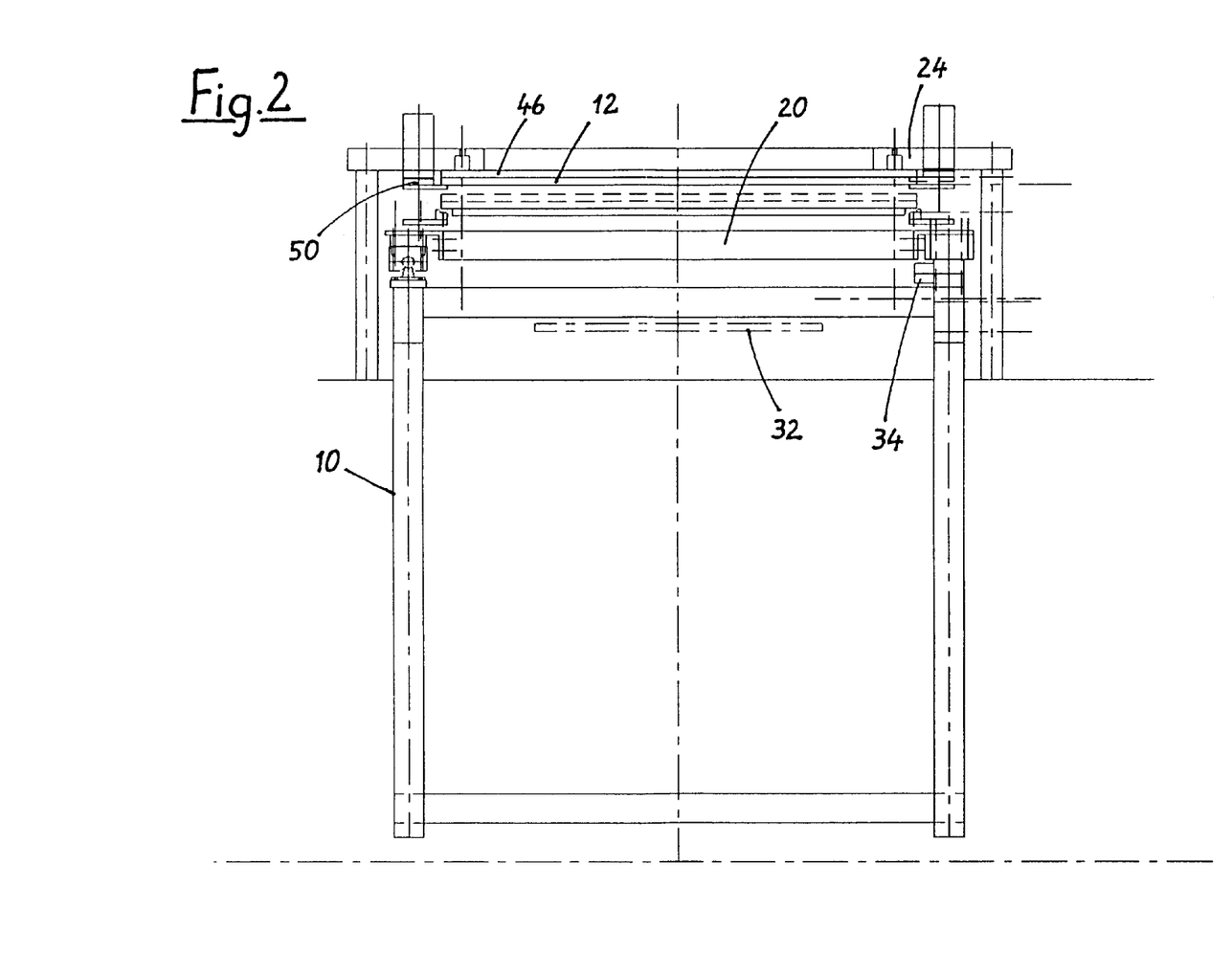
FIG. 2, a vertical cross section through the apparatus of FIG. 1.

The drive of the carriage 20 is merely suggested in the drawing in FIG. 2. It may be a pneumatic of hydraulic cylin-der, or an electric motor drive with a drive spindle.

For accurate positioning of the workpiece holders 12 on the carriage 20 and on the support plates 32, pins are used in each case which engage suitably disposed, fitting holes in the workpiece holders 12. In this example, two pins 36 on the right-hand half of the carriage 20 form a first socket, and two pins 38 on the left-hand half of the carriage 20 form a second socket for the workpiece holders to be placed on the carriage. The workpiece holders are also provided with pins on their top side, which engage correspondingly disposed, fitting holes in the printed circuit boards to be received. If batches of different-sized printed circuit boards are being processed, then preferably at least one pin is adjustable in its position and can be adjusted to the applicable size of printed circuit board.

Figure 3:
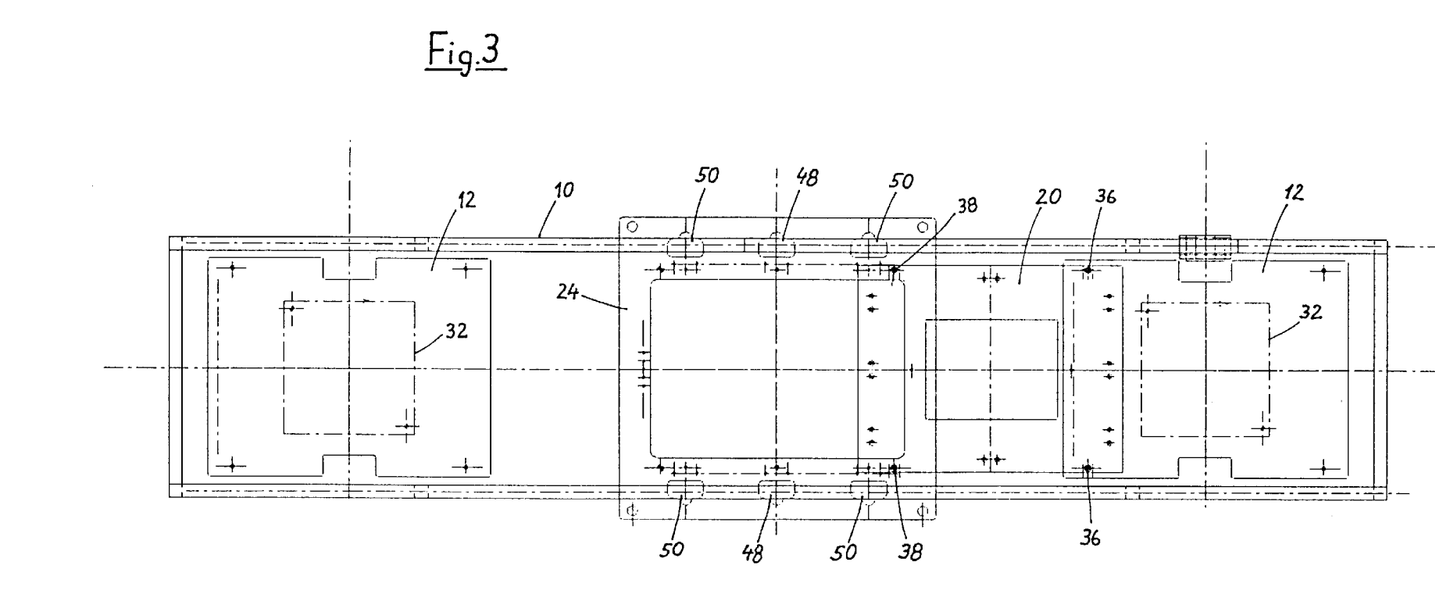
FIG. 3, a plan view of the apparatus of FIG. 1.

FIG. 3 shows a plan view in which one workpiece holder 12 each is located in the charging station 16 and in the discharge station 26. The support plates 32 located below the workpiece holders 12 are shown in dot-dash lines.

Figure 4:
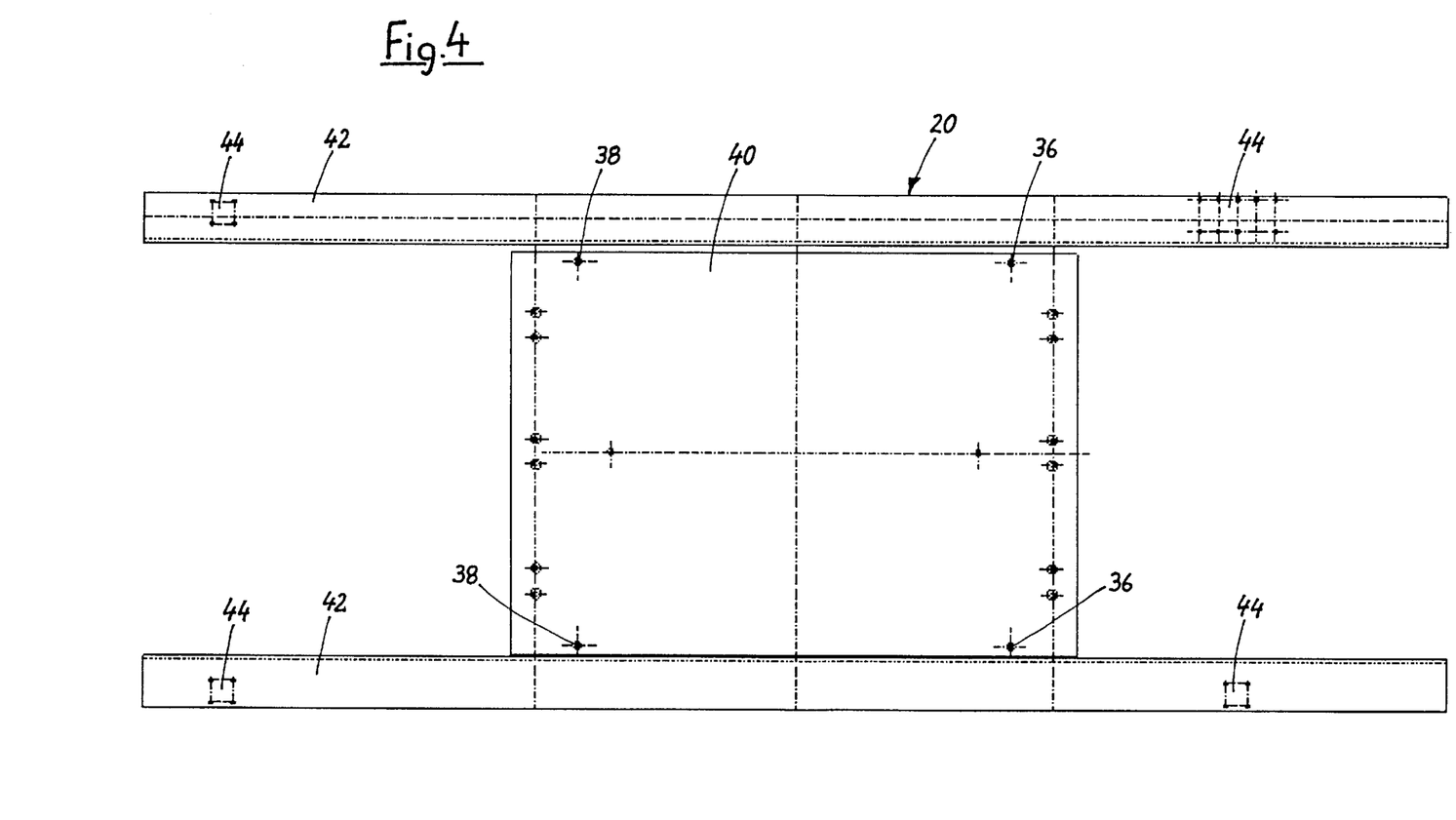
FIG. 4, a plan view of a carriage that can be moved back and forth between the charging station and the discharge station.

The shape of the carriage 20 can be seen from FIG. 1 and FIG. 4. It can be seen that in plan view it is substantially in the form of an H, with a center portion 40 forming the crossbar and carrying the pins 36, 38, and with legs 42 extending in the direction of motion, on each of which legs a bearing block 44 is secured. Each of the two workpiece hol-ders 12 to be received by the carriage 20 rests on two bearing blocks 44 and on the middle part 40, with the position securing pins 36 and 38, respectively.

The particular shape of the carriage 20 makes it possible for the support plates 32, in their vertical motion, to move freely between the legs 42, since the width of the support plates 32 is less than the crosswise spacing between the legs 42. This is correspondingly true for the conveyor belts 14. They are not shown in FIG. 2, but like the legs 42 of the carriage 20, they extend in the region of the longitudinal edges of the stand 10, so that the support plates 32 can also move unhindered up and down between the two parallel conveyor belts 14, which are driven in synchronized fashion.

Figure 5:
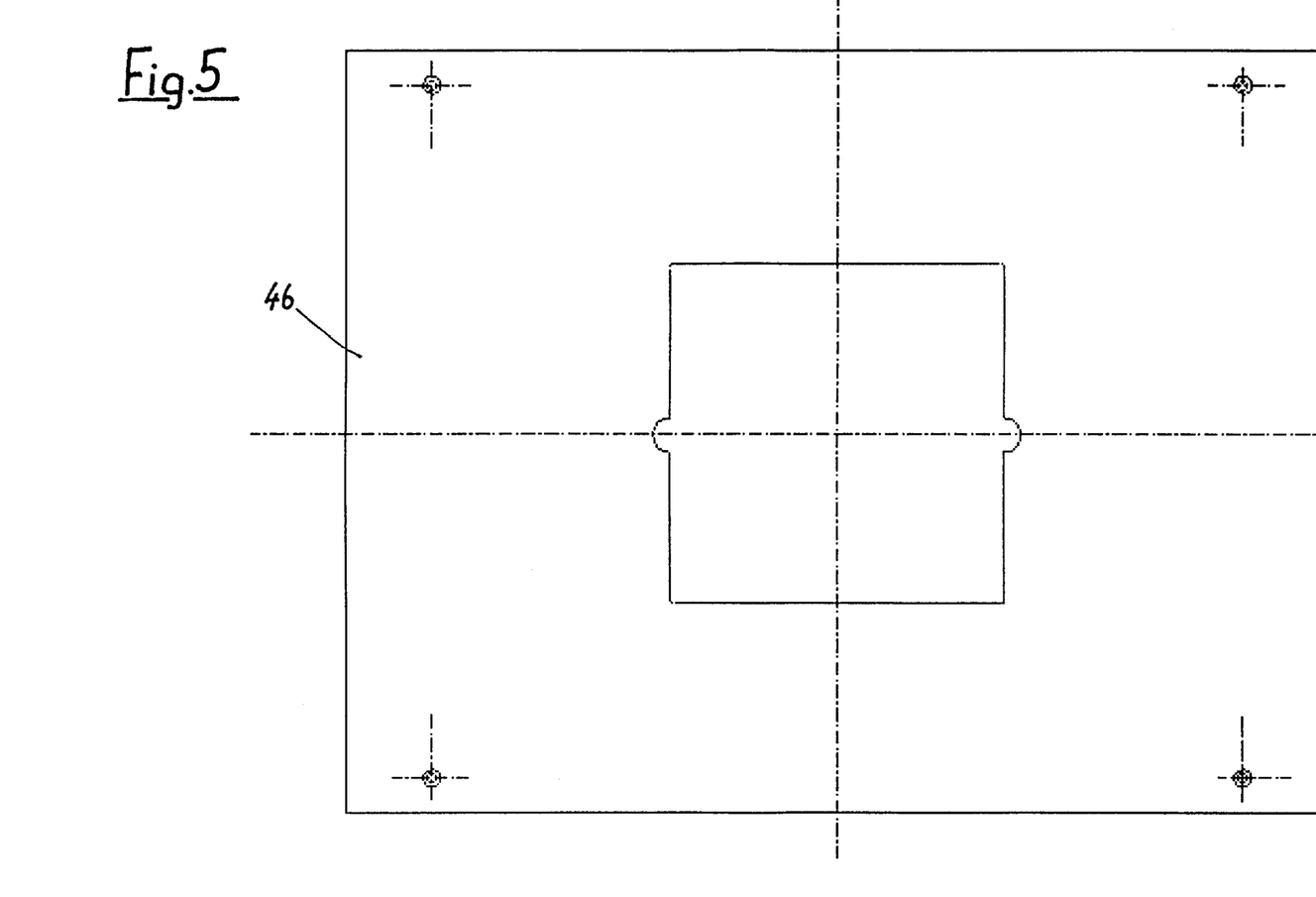
FIG. 5, a plan view of an adapter frame that can be braced under a base frame in the work station.

In the work station 22, the frame 24 is mounted in a stationary though if desired a position device 60 can be provided to position the frame under control in two horizontal axes fashion. If only printed circuit boards of a certain constant size are being machined, for instance being drilled with a laser, then a suitably dimensioned frame 24 suffices, against whose underside the workpiece holders 12 are pressed, with the printed circuit boards resting on them, in such a way that the boards are fastened all the way around and thereby straightened as well. If different sizes of printed circuit boards are to be processed, then a relatively large base frame 24 to suit the largest printed circuit boards to be processed is used, and a smaller adapter frame is braced beneath it, the inside width of which adapter frame corresponds to the smaller printed circuit boards to be processed. To brace an adapter frame 46, for instance as shown in FIG. 5, against the underside of the base frame 24, tension claws 48 shown in FIG. 3 are used, and for bracing the workpiece holders 12 with printed circuit boards resting on them against the underside of the adapter frame 46, further tension claws 50 are used. The tension claws 48, 50 are mounted on the base frame 24, optionally adjustably to accommodate different sizes of printed circuit board, and are for instance actuated by pneumatic or hydraulic cylinders. Since they engage the adapter frame 46 and then the workpiece holders 12, lift them from the carriage 20, and brace them to the base frame 24, all from above, they are as little hindrance to the motion of the carriage as the lifting cylinders 30 and support plates 32 that operate between the legs 42 of the carriage 20.

In the exemplary embodiment, the printed circuit boards are placed on the workpiece holders 12 in the charging station 16 by hand, or by a robot arm or other suitable charging device 62, while the loading device 18 keeps the workpiece holder in the uppermost position 12a shown in dashed lines. In the discharge station 26, the printed circuit boards are removed with the unloading device 28 raised upward, the removal again being done by hand, for instance, or by a robot arm or other suitable discharging device 64. The workpiece holders 12 accordingly trans-port the printed circuit boards only from the charging station 16 to the discharge station 26, via the work station 22. After that, the empty workpiece holders are transported back to the charging station 16 by the conveyor belts 14. As an alternative it would also be possible to remove the printed circuit boards from the workpiece holders 12 at the charging station 16 either still at the level N2 or after they have been raised to the level N3 by discharging device 64, immediately before placing a further printed circuit board to be processed on them.

If as described above the frame 24 is fixed in the work station 22, then the tool that acts on the workpieces, such as the laser, must execute the required motions for machining in the longitudinal and transverse directions to the stand 10 and the frame 24. Focusing needs to be done only once, because once the printed circuit boards have been fastened to the frame 24, the surfaces of these boards—regardless of their fluctuating thickness and any warping—coincide with the plane of the underside of the base frame 24 or adapter frame 46.

What is claimed is:

1. An apparatus for transporting respective workpieces on respective workpiece holders and for circulating the workpiece holders for reuse comprising:
 a plurality of workpiece holders which hold respective workpieces;
 a carriage having a first socket and a second socket each of which said sockets vertically receives from above and then holds thereon a respective said workpiece holder, said carriage being mounted for movement in a linear horizontal direction between (a) a front position where said first socket is located at a charging station and said second socket is located at a work station and (b) a rear position where said first socket is located at the work station and said second socket is located at a discharge station;
 a loading device located at the charging station which places a said workpiece holder on said first socket when said carriage is in the front position;
 a lifting device located at the work station which lifts the said workpiece holder located on said first socket therefrom when said carriage is in the rear position and which places the said workpiece holder lifted from the first socket onto the second socket when said carriage is subsequently in the front position;
 an unloading device located at the discharge station which lifts the said workpiece holder from said second socket when said carriage is in the rear position; and
 a conveyor which transports said workpiece holders from the discharge station back to the charging station.

2. The apparatus of claim 1, wherein there are three of said workpiece holders which circulate.

3. The apparatus of claim 1;
 wherein there are four of said workpiece holders which circulate; and
 wherein said conveyor moves each said workpiece holder from the discharge station to the charging station in two steps.

4. The apparatus of claim 1:
 wherein said carriage has an H shape in plan view so that said carriage includes two parallel legs which are parallel to the direction of movement; and
 wherein said loading device is positioned to move vertically between said legs when said carriage is in the front position, and wherein said unloading device is positioned to move vertically between said legs when said carriage is in the rear position.

5. The apparatus of claim 4:
 wherein said sockets are each formed by at least two pins protruding upward from a top side of said H-shaped carriage; and
 wherein each said workpiece holder includes bores which are correspondingly disposed for cooperation with said pins of each said socket.

6. The apparatus of claim 1:
 wherein said loading device includes a first lifting cylinder and a first support plate which is vertically moved by an upper end of said first lifting cylinder between a plane located above said carriage and a plane located below said carriage;
 wherein said unloading device includes a second lifting cylinder and a second support plate which is vertically moved by an upper end of said second lifting cylinder between an upper plane located above said carriage and a lower plane located below said carriage;
 wherein said first and second plates each include upwardly protruding pins; and
 wherein each said workpiece holder includes bores which are correspondingly disposed for cooperation with said pins of each said support plate.

7. The apparatus of claim 6:
 wherein said conveyor comprises parallel conveyor belts extending below said carriage and above the lower plane; and
 wherein said loading device and unloading device are disposed between said conveyor belts.

8. The apparatus of claim 1, wherein said workpiece holders each comprise a plate element having an upper side and wherein said sockets are pins extending from the upper side on which the workpiece is received.

9. The apparatus of claim 8, wherein at least one of said pins of each workpiece holder is adjustably mounted so that workpieces of difference sizes may be held by said workpiece holder.

10. The apparatus of claim 8, and further including:
 a charging device located next to the charging station which places workpieces on the workpiece holders; and
 a discharging device located next to the discharge station which removes workpieces from the workpiece holders.

11. The apparatus of claim 8, and further including:
 a charging device located next to the charging station which places workpieces on the workpiece holders; and
 a discharging device located next to the charging station which removes workpieces from the workpiece holders after transporting thereto by said conveyor.

12. The apparatus of claim 8, and further including a frame mounted above said carriage at the work station, said frame having an underside against which said lifting device presses said workpiece holder and the workpiece held thereon after lifting of the workpiece holder from said carriage.

13. The apparatus of claim 12, wherein said lifting device includes lifting claws mounted on opposite sides of said frame.

14. The apparatus of claim 12, wherein said frame comprises a base frame and an adapter frame detachably mounted to an underside of said base frame, said adapter frame being sized to receive the workpiece being worked on at the work station.

15. The apparatus of claim 12, wherein said frame is stationary in the work station.

16. The apparatus of claim 12, and further including a positioning device which controllably moves said frame horizontally.

17. An apparatus for transporting respective workpieces on respective workpiece holders and for circulating the workpiece holders for reuse comprising:
 a plurality of workpiece holders which hold respective workpieces;
 a carriage having a linear and horizontal direction of movement between a front position and a rear position, said carriage having a first socket and a second socket offset in the direction of movement from said first socket, each of which said sockets vertically receives from above and then holds thereon a respective said workpiece holder on said carriage;

a loading device located at a charging station which places a said workpiece holder on said first socket when said carriage is in the front position;

a lifting device located at a work station which lifts the said workpiece holder located on said first socket therefrom when said carriage is in the rear position and which places the said workpiece holder lifted from the first socket onto the second socket when said carriage is subsequently in the front position;

an unloading device located at a discharge station which lifts the said workpiece holder from said second socket when said carriage is in the rear position; and a conveyor which transports said workpiece holders from the discharge station back to the charging station.

* * * * *